United States Patent
Shaikh et al.

(10) Patent No.: US 9,167,614 B2
(45) Date of Patent: Oct. 20, 2015

(54) TUNNELED DIRECT LINK SETUP SYSTEMS AND METHODS WITH CONSISTENT LINK INFORMATION MAINTENANCE

(75) Inventors: Furquan Shaikh, Maharashtra (IN); Pradeep Jugraj Nemavat, Maharashtra (IN)

(73) Assignee: Marvell International Ltd., Hamilton (BM)

( * ) Notice: Subject to any disclaimer, the term of this patent is extended or adjusted under 35 U.S.C. 154(b) by 389 days.

(21) Appl. No.: 13/597,960

(22) Filed: Aug. 29, 2012

(65) Prior Publication Data

US 2013/0077611 A1  Mar. 28, 2013

Related U.S. Application Data

(60) Provisional application No. 61/540,104, filed on Sep. 28, 2011.

(51) Int. Cl.
*H04W 76/04* (2009.01)
*H04W 76/02* (2009.01)

(52) U.S. Cl.
CPC .................... *H04W 76/023* (2013.01)

(58) Field of Classification Search
CPC . H04W 76/023; H04W 76/022; H04W 28/16; H04W 76/02; H04W 76/021; H04W 28/24; H04W 76/025; H04W 48/16; H04W 40/12; H04W 40/22; H04W 72/085; H04W 76/048; H04W 84/12; H04W 88/04; H04W 8/005; H04W 76/043

See application file for complete search history.

(56) References Cited

U.S. PATENT DOCUMENTS

| | | | | |
|---|---|---|---|---|
| 2003/0131079 A1* | 7/2003 | Neale et al. | | 709/220 |
| 2006/0165035 A1* | 7/2006 | Chandra et al. | | 370/329 |
| 2007/0217378 A1* | 9/2007 | Moorti et al. | | 370/338 |
| 2008/0320540 A1* | 12/2008 | Brooks et al. | | 725/118 |
| 2009/0022125 A1* | 1/2009 | Seok | | 370/338 |
| 2010/0177699 A1* | 7/2010 | Klefter et al. | | 370/328 |
| 2011/0007692 A1* | 1/2011 | Seok | | 370/328 |
| 2011/0261755 A1* | 10/2011 | Cordeiro et al. | | 370/328 |

OTHER PUBLICATIONS

IEEE P802.11z/D0.3, Jan. 2008 Specification, (Draft Amendment to IEEE Std. 802.11-2008) Part 11: Wireless LAN Medium Access Control (MAC) and Physical Layer (PHY) Specifications.

\* cited by examiner

*Primary Examiner* — Andrew Lai
*Assistant Examiner* — M Mostazir Rahman

(57) ABSTRACT

A method includes directly receiving, at a first station, a signal transmitted from a second station. Each of the first and second stations respectively includes a link status indicator that indicates whether a direct link exists between the first and second stations. The signal was transmitted based on the link status indicator of the second station indicating that a direct link does exist between the first and second stations. Responsive to the link status indicator of the first station indicating that a direct link does not exist between the first station and the second station, the signal is dropped, and a teardown signal is transmitted from the first station to the second station. Responsive to the teardown signal, the link status indicator of the second station is to be changed, by the second station, to indicate that a direct link does not exist between the first and second stations.

24 Claims, 5 Drawing Sheets

TUNNELED DIRECT LINK SETUP SYSTEMS AND METHODS WITH CONSISTENT LINK INFORMATION MAINTENANCE

CROSS-REFERENCE TO RELATED APPLICATIONS

This application claims the benefit of U.S. Provisional Application No. 61/540,104, filed on Sep. 28, 2011. The disclosure of the above application is incorporated herein by reference in its entirety.

FIELD

The present disclosure relates to wireless local area networks (WLANs), and more particularly to tunneled direct link setup (TDLS) systems.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A WLAN may include one or more basic service sets (BSSs). Each of the BSSs includes an access point (AP) and a group of stations (STAs). The STAs can communicate with each other via the AP or directly with each other by establishing a TDLS link. A TDLS link setup process is performed to establish the TDLS link. A TDLS link setup includes transmission of signaling frames that are encapsulated in data frames, such that the signaling frames can be transmitted between stations via an access point.

The TDLS link setup process can include, for example, a first station $STA_1$ transmitting a setup request signal to a second station $STA_2$ via an AP. The setup request signal can include, for example, a link identifier and an association request frame body. The link identifier includes source and destination addresses and a BSS identifier. The association request frame body is provided to request setup of the TDLS link. The AP forwards the setup request signal received from the first station $STA_1$ to the second station $STA_2$.

The second station $STA_2$ then transmits a setup response signal to the first station $STA_1$ via the AP. The first station $STA_1$ transmits an acknowledgement signal (ACK) to the AP to acknowledge receipt of the setup response signal. The first station $STA_1$ then transmits a setup confirmation signal to the second station $STA_2$. The second station $STA_2$ can then transmit an ACK signal to the first station $STA_1$ to acknowledge receipt of the setup confirmation signal and to complete setup of the TDLS link. The stations $STA_1$, $STA_2$ can communicate directly with each other upon completing setup of the TDLS link.

SUMMARY

A method is provided and includes directly receiving, at a first station, a signal transmitted from a second station. Each of the first station and the second station respectively includes a link status indicator that indicates whether a direct link exists between the first station and the second station. The signal directly received at the first station was transmitted by the second station based on the link status indicator of the second station indicating that a direct link does exist between the first station and the second station. Responsive to the link status indicator of the first station indicating that a direct link does not exist between the first station and the second station, the signal received at the first station is dropped, and a teardown signal is transmitted from the first station to the second station. Responsive to the teardown signal being transmitted from the first station to the second station, the link status indicator of the second station is to be changed, by the second station, to indicate that a direct link does not exist between the first station and the second station.

In other features, a system is provided and includes a physical layer module and a control module. The physical layer module is configured to directly receive at a first station a signal transmitted from a second station. Each of the first station and the second station respectively includes a link status indicator that indicates whether a direct link exists between the first station and the second station. The signal directly received at the first station was transmitted by the second station based on the link status indicator of the second station indicating that a direct link does exist between the first station and the second station. The control module is configured to, in response to the link status indicator of the first station indicating that a direct link does not exist between the first station and the second station, drop the signal received at the first station, and transmit a teardown signal from the first station to the second station. Responsive to the teardown signal being transmitted from the first station to the second station, the link status indicator of the second station is to be changed, by the second station, to indicate that a direct link does not exist between the first station and the second station.

In other features, a non-transitory computer readable medium is provided that stores a computer program with instructions to directly receive, at a first station, a signal transmitted from a second station. Each of the first station and the second station respectively includes a link status indicator that indicates whether a direct link exists between the first station and the second station. The signal directly received at the first station was transmitted by the second station based on the link status indicator of the second station indicating that a direct link does exist between the first station and the second station. The computer program further includes instructions to, in response to the link status indicator of the first station indicating that a direct link does not exist between the first station and the second station, drop the signal received at the first station, and transmit a teardown signal from the first station to the second station. Responsive to the teardown signal being transmitted from the first station to the second station, the link status indicator of the second station is to be changed, by the second station, to indicate that a direct link does not exist between the first station and the second station.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Figure 1:
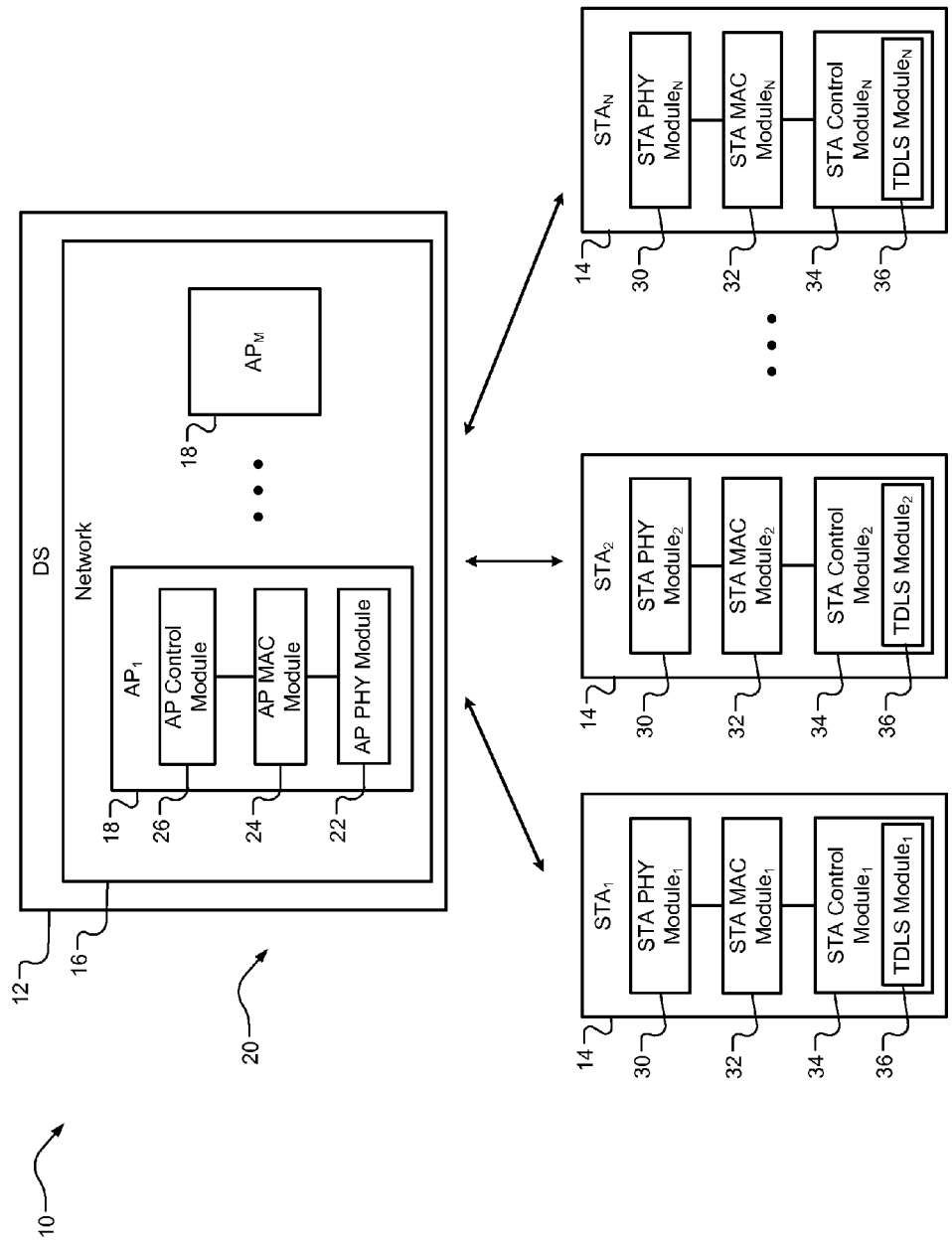
FIG. 1 is a functional block diagram of a wireless local area network (WLAN) incorporating TDLS modules in accordance with the present disclosure.

A BSS can include an AP and multiple stations including a first station $STA_1$ and a second station $STA_2$. Each of the stations $STA_1$, $STA_2$ can have, for example, a link status indicator or other suitable technique for tracking whether a TDLS link is established between the stations $STA_1$, $STA_2$. As an example, a link status indicator of '0' indicates that a link is not established. A link status indicator of '1' indicates that a link is established.

In addition to or as an alternative to storing link status indicators, link information associated with a TDLS link between the stations $STA_1$, $STA_2$ may be stored at each of the stations $STA_1$, $STA_2$. The link information may be accessed when determining whether a TDLS link is established. The link information may include addresses of the stations $STA_1$, $STA_2$, communication protocol identifiers, a link identifier, a communication rate, etc. The link information stored at one of the stations $STA_1$, $STA_2$ may include a link status indicator for that station. As an alternative example, the first station $STA_1$ may determine that a link does not exist between the stations $STA_1$, $STA_2$ when predetermined link information for a TDLS link between the stations $STA_1$, $STA_2$ is invalid and/or not stored at the first station $STA_1$.

In certain situations, a condition can exist in which the link status indicator of one of the stations (e.g., $STA_1$) is different than the link status indicator of another station (e.g., $STA_2$)— also referred to herein as ("inconsistent link information condition"). Example situations are described below. Although for the following described situations link status indicators are used to illustrate conditions in which inconsistent link information exist among various stations, other link information may be used to indicate whether a link exists.

As a first example situation, an inconsistent link information condition can occur when the first station $STA_1$ does not receive an ACK signal transmitted from the AP to the first station $STA_1$ to acknowledge receipt of the setup confirmation signal. Although the ACK signal may have been transmitted multiple times, if the first station $STA_1$ does not receive the ACK signal, the first station $STA_1$ sets and/or maintains a link status indicator of 0. The first station $STA_1$ clears parameters and resources reserved for the direct link being established for the second station $STA_2$. Since the second station $STA_2$ received the setup confirmation signal, the second station sets and/or maintains a link status indicator of 1. As a result, the link status indicators of the stations $STA_1$, $STA_2$ are different and an inconsistent link information condition exists.

As another example, an inconsistent link information condition can occur subsequent to a TDLS link being established between the stations $STA_1$, $STA_2$ when one of the stations $STA_1$, $STA_2$ loses BSS information associated with the BSS. This may occur, for example, when a station loses power, is reset, and/or is rebooted. The station that lost the BSS information (e.g., the first station $STA_1$) may reestablish association with the BSS. In this example, the first station $STA_1$ may not have been able to transmit a TDLS teardown signal to the second station $STA_2$ prior to the first station $STA_1$ losing power, being reset and/or being rebooted. A TDLS teardown signal is typically transmitted from an initiator station (e.g., the first station $STA_1$) to a receiving station (e.g., the second station $STA_2$) to indicate, for example, that the initiator station is: shutting down, leaving a network in which the receiving station is located; and/or no longer is to have a direct link with the receiving station. A station receiving a teardown signal can then clear parameters and resources reserved and/or associated with a TDLS link previously established. As a result of a TDLS teardown signal not being received by the second station $STA_2$, the first station $STA_1$ can have a link status indicator of 0 and the second station can have a link status indicator of 1.

As yet another example, an inconsistent link information condition can occur when: a TDLS link exists between the stations $STA_1$, $STA_2$; the first station $STA_1$ transmits a TDLS teardown signal to the second station $STA_2$ via the AP and/or the TDLS link; and the first station $STA_1$ does not receive an ACK for the transmitted teardown signal. The first station $STA_1$ may not receive the ACK and/or the second station $STA_2$ may not receive the TDLS teardown signal when, for example, the second station $STA_2$ temporarily moves out of a network of the first station $STA_1$ and/or becomes temporarily disassociated with the BSS of the first station $STA_1$. The second station $STA_2$ can become disassociated with the BSS when moving out of a predetermined range of the BSS and/or out of range of the AP and/or stations in the BSS.

The second station $STA_2$ may move back into the network of the first station $STA_1$ and/or become reassociated with the BSS. As a result of the first station $STA_1$ not receiving an ACK, the first station $STA_1$ may clear parameters and resources reserved and/or associated with the TDLS link previously established. Upon the second station $STA_2$ returning to the network and/or upon rejoining the BSS, the link status indicator of the first station $STA_1$ is 0 and the link status indicator of the second station $STA_2$ may be 1.

As still a further example, an inconsistent link information condition can occur when a TDLS link previously existed between stations $STA_1$, $STA_2$, but no longer exists according to the first station $STA_1$. Subsequent to the first station $STA_1$ losing TDLS link information and/or an indication that a TDLS link existed between the stations $STA_1$, $STA_2$, the first station $STA_1$ sends an address resolution protocol (ARP) request to the AP.

The ARP request may be transmitted, for example, by the first station $STA_1$ to determine an Internet protocol (IP) address or a media access control (MAC) address of the second station $STA_2$ and/or to establish a direct link between the stations STA1, STA2. The first station $STA_1$ may have one of an IP address and a MAC address (known address) of the second station $STA_2$ and may transmit an ARP request to determine another one of the IP address and MAC address (unknown address) of the second station $STA_2$. The ARP request may include an IP address and a MAC address of the first station $STA_1$ and the known address of the second station $STA_2$.

The AP broadcasts the ARP request to multiple stations including the second station $STA_2$ in the BSS. Subsequent to receiving the ARP request, the second station $STA_2$ transmits an ARP response with the unknown address to the first station $STA_1$ via the TDLS link. The second station $STA_2$ may compare the known address received from the first station $STA_1$ with either the IP address or the MAC address of the second station $STA_2$. The second station $STA_2$ transmits the ARP response to the first station $STA_1$ when there is a match between the known address and one of the IP address and the MAC address of the second station $STA_2$.

The ARP response may include a 'to' distribution system bit ToDS and a 'from' distribution system bit FromDS. A distribution system (DS) refers to an infrastructure that includes and connects multiple APs to provide an extended service set (ESS). The bits ToDS, FromDS, referred to as distribution system bits, are provided in a header of a received packet and indicate a type of network associated with the received packet. For example, if the bits ToDS, FromDS are each set to '0' then the packet is being transmitted directly between the stations $STA_1$, $STA_2$, as opposed to being transmitted between the stations $STA_1$, $STA_2$ via the AP and/or other AP(s). If the bit ToDS is set to '1' then the packet is transmitted wirelessly from a station to the DS. If the bit FromDS is set '1' then the packet is received from the DS via an AP and/or a wired node of the DS.

Continuing from the above example and subsequent to the first station $STA_1$ transmitting the ARP request, the first station $STA_1$ then: receives the ARP response; transmits an ACK signal to the second station acknowledging receipt of the ARP response; and drops the ARP response. The determination as to whether the ACK signal is to be transmitted is a low-level determination that is typically executed in hardware by a physical layer (PHY) device and/or MAC device. The PHY device and/or the MAC device does not check whether the packet was received directly via a TDLS link. Although this does not cause an issue at lower-layers (e.g., PHY and MAC layers), this can cause communication failures for higher-layers (e.g., network, transport, session, presentation, and/or application layers). One or more of the higher-layers can detect that a TDLS link does not exist and as a result cause signals received via a TDLS link including the ARP response to be dropped. As a result, the ARP response is dropped because the first station $STA_1$ is unable to find an indication in a database that a TDLS link between the stations $STA_1$, $STA_2$ exists.

Since the first station $STA_1$ is unaware of a TDLS link between the stations $STA_1$, $STA_2$ and since the first station $STA_1$ transmits an ACK signal to the second station $STA_2$ in response to the ARP response being directly received from the second station $STA_2$, an inconsistent link information condition exists. According to the second station $STA_2$, a TDLS link is active between the stations $STA_1$, $STA_2$. According to the first station $STA_1$, a TDLS link does not exist between the stations $STA_1$, $STA_2$. As a result, the stations $STA_1$, $STA_2$ are unable to perform a data exchange between the stations $STA_1$, $STA_2$. Also, the second station $STA_2$ does not teardown the TDLS link since the second station $STA_2$ has not detected that packets are unsuccessfully being transmitted via the TDLS link.

The below described techniques minimize time that inconsistent link information conditions exist and/or prevent inconsistent link information conditions from occurring. This minimizes loss of packets, minimizes a number of signals being dropped, improves communication between stations and/or devices of a network, and/or improves efficiency of network resources.

In FIG. 1, a WLAN 10 is shown and includes a DS 12 and stations 14. The DS 12 may include a network 16 with one or more APs 18. The network 16 may include wired and wireless networks. The WLAN 10 may also include one or more BSSs (a single BSS 20 is shown). The BSS 20 includes one or more APs (e.g., $AP_1$) and two or more of the stations 14. The stations 14 may communicate directly with each other via TDLS links and/or with each other via the DS 12. The stations 14 may communicate wirelessly with each other. This wireless communication may satisfy Institute of Electrical and Electronic Engineers (IEEE) standard P802.11z-2010.

The APs 18 may each include an AP PHY module 22, an AP MAC module 24, and an AP control module 26. The AP PHY module 22 receives signals from and transmits signals to the stations 14. The AP MAC module 24 is connected between the AP PHY module 22 and the AP control module 26. The AP PHY module 22 or the AP MAC module 24 may generate ACK signals in response to signals received from the stations 14. The AP control module 26 may include devices associated with layers higher than the a PHY layer and a MAC layer, such as devices of a network layer, a transport layer, a session layer, a presentation layer, and/or an application layer. Each of the APs 18 can be a router, a switch, a computer, a server, and/or other suitable AP devices.

Each of the stations 14 may be, for example, a mobile device, a computer, and/or a cellular phone. Each of the stations 14 may include a station PHY module 30, a station MAC module 32, and a station control module 34. The station PHY modules 30 communicate with each other via TDLS links and/or via the DS 12 and/or one or more of the APs 18. Each of the station MAC modules 32 is connected between a respective one of the station PHY modules 30 and a respective one of the station control modules 34. Each of the modules 30, 32 may generate ACK signals in response to signals received from the APs 18 and/or from the stations 14. Each of the station control modules 34 includes a TDLS module 36.

The TDLS modules 36 set up and teardown TDLS links including preventing and/or eliminating inconsistent link information conditions. Operations of the TDLS modules 36 are further described with respect to the methods of FIGS. 3-6.

Figure 2:
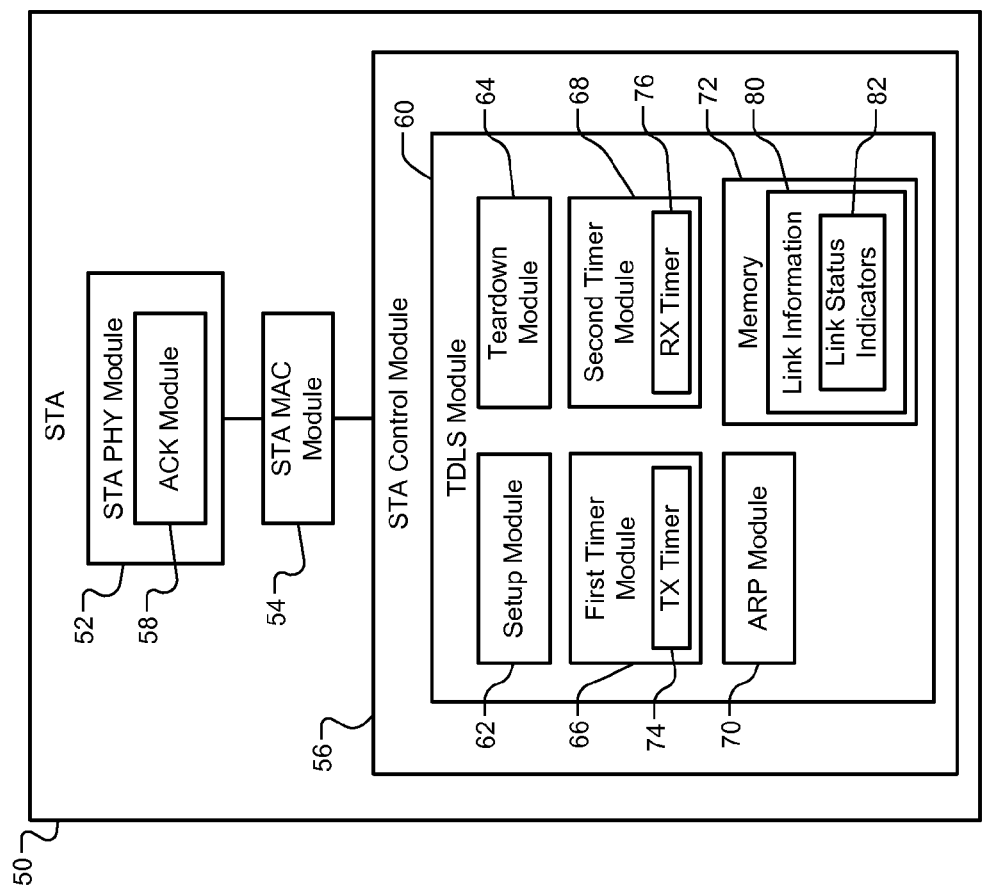
FIG. 2 is a functional block diagram of a station incorporating a TDLS module in accordance with the present disclosure.

Referring now also to FIG. 2, a station 50 is shown. Each of the stations 14 of FIG. 1 can be configured as the station 50. The station 50 includes a system 51 with a station PHY module 52, a station MAC module 54, and a station control module 56. The station PHY module 52 may include an ACK module 58. The ACK module 58 generates ACK signals in response to receiving other signals from devices (e.g., the APs 18 and/or one of the stations 14) separate from the station 50.

The station control module 56 includes a TDLS module 60. The TDLS module 60 includes a setup module 62, a teardown module 64, a first timer module 66, a second timer module 68, an ARP module 70 and memory 72. In one implementation, the setup module 62 and the ARP module 70 are combined to provide a single module. The setup module 62 may generate and/or receive setup request signals and setup response signals to setup a TDLS link between the station 50 and one of the stations 14. The teardown module 64 tears down TDLS links. The teardown module 64 may (i) initiate a teardown and transmit a teardown request signal to a station and/or (ii) receive a teardown request signal from a station other than the station 50 and perform a teardown of a TDLS link at the station 50.

The first timer module 66 and the second timer module 68 monitor TDLS links. The first timer module 66 includes a transmit timer 74 and is associated with signals transmitted from the station 50 via the TDLS links to other stations. The second timer module 68 includes a receive timer 76 and is associated with signals received from the other stations by the station 50 via the TDLS links. The first timer module 66 records and/or tracks contiguous first amounts of time for each of the TDLS links for which the station 50 has not transmitted a signal via the TDLS link. The second timer module 68 records and/or tracks contiguous second amounts of time for each of the TDLS links for which the station 50 has not received a signal via the TDLS link.

The ARP module 70 may generate and/or receive ARP request signals and ARP response signals. The ARP request signals and ARP response signals may be generated to determine IP and/or MAC addresses of stations (i) in a BSS of the station 50 and/or (ii) associated with an AP of the station 50. The ARP request signals and ARP response signals may be transmitted to initiate setup of a TDLS link. ARP request signals and ARP response signals refer to signals that satisfy an address resolution protocol.

The memory 72 may store link information 78 including link status indicators 80. The link information and/or the link status indicators may indicate whether there is a TDLS link between the station 50 and one or more of the other stations (e.g., the stations 14). In addition to the link status indicators, the link information may further include, for example, station identifiers, station addresses including IP address and MAC addresses, communication protocols, data rates, packet sizes, frequencies of communication channels, and other link information.

Figure 3:
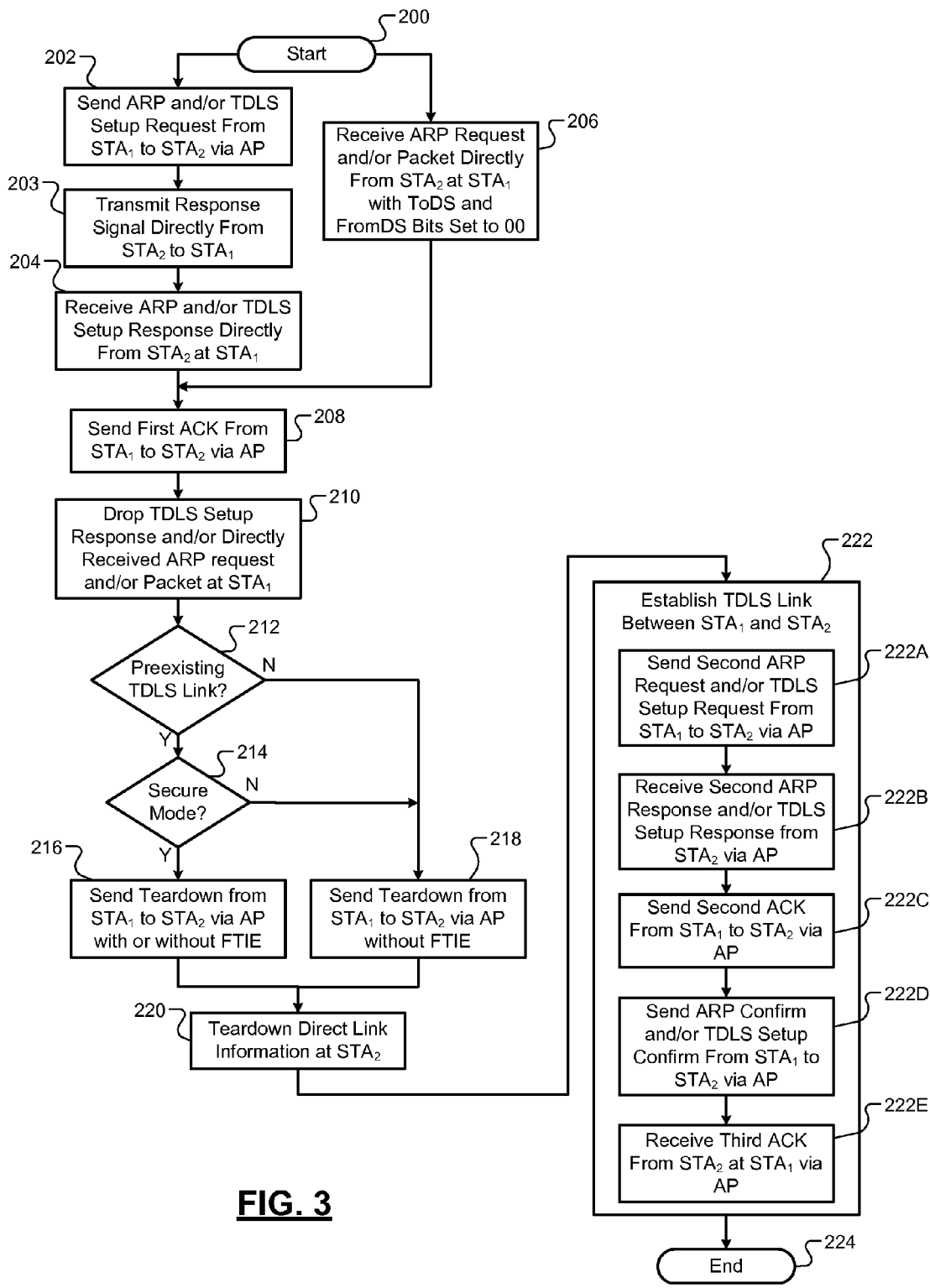
FIG. 3 illustrates a TDLS method including TDLS link teardown in accordance with the present disclosure.
Figure 4:
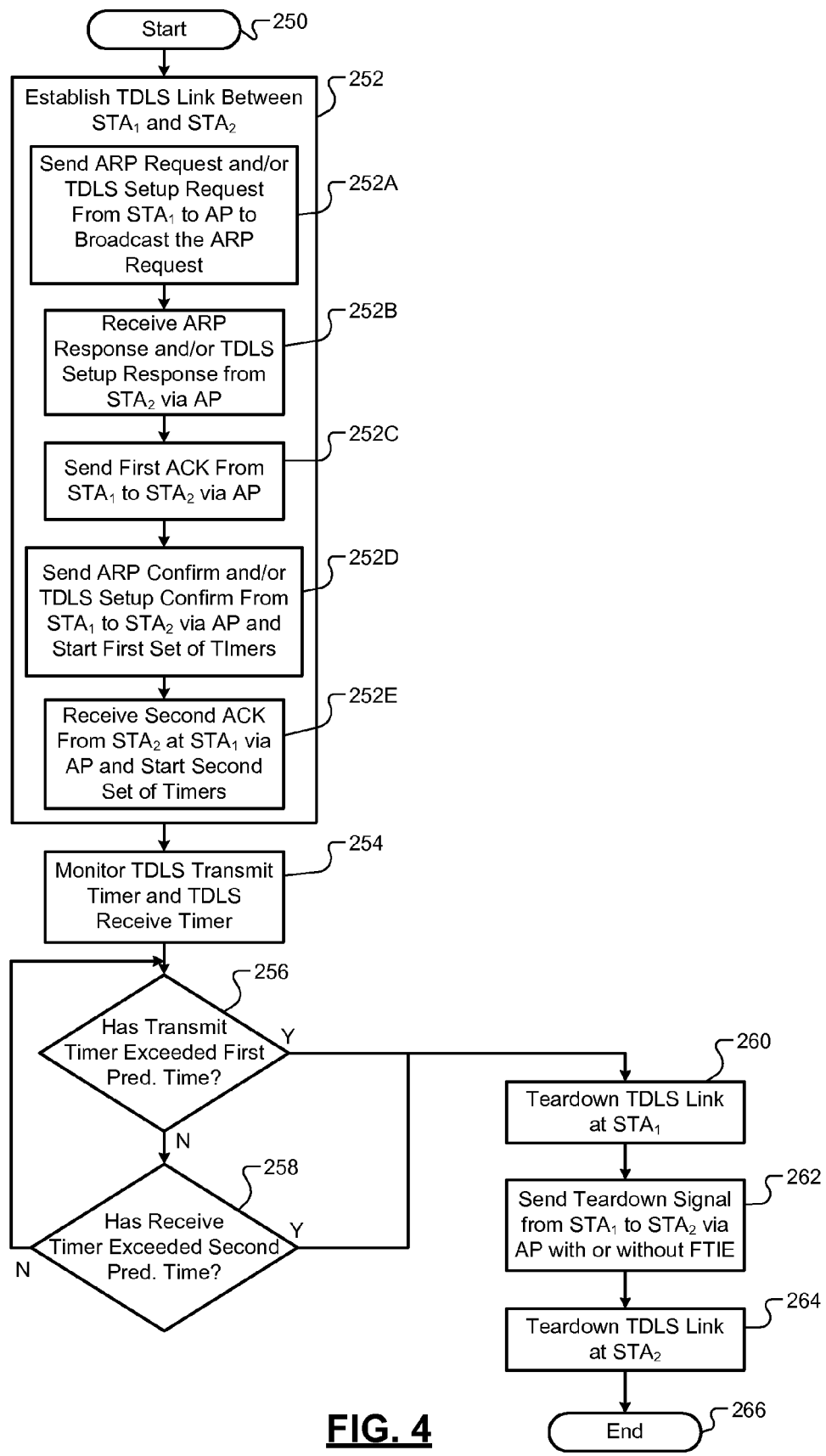
FIG. 4 illustrates a broadcast-initiated TDLS method with timer-based TDLS link teardown in accordance with the present disclosure.
Figure 5:
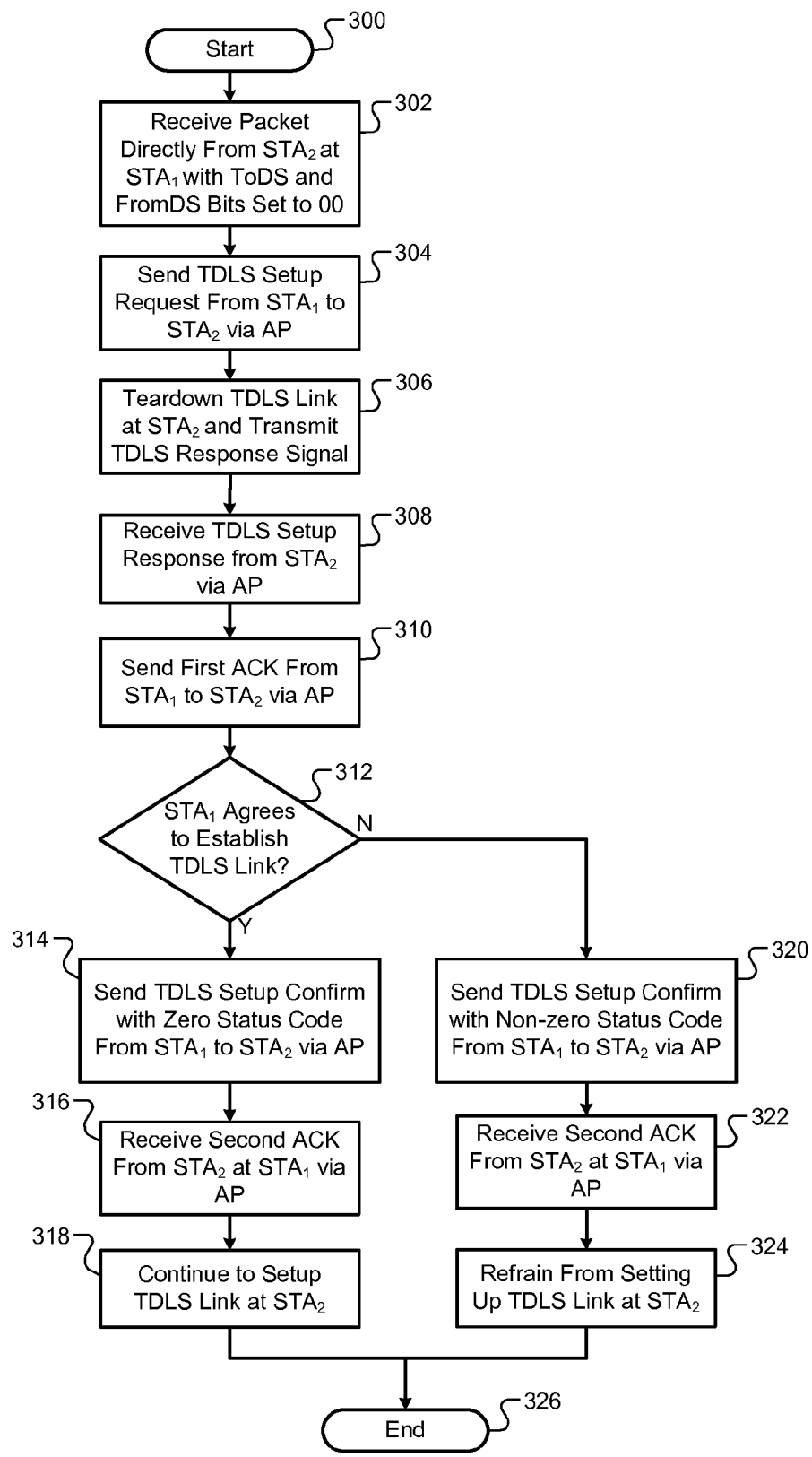
FIG. 5 illustrates a TDLS method including TDLS link teardown without teardown signal transmission in accordance with the present disclosure.

The WLAN 10, APs 18 and stations 14, 50 of FIGS. 1 and 2 may be operated using numerous methods, FIGS. 3-5 provide example methods. Each of the stations 14, 50 may perform one or more of the example methods. In FIG. 3, a TDLS method including TDLS link teardown is shown. Although the following tasks are primarily described with respect to the implementations of FIGS. 1-2, the tasks may be easily modified to apply to other implementations of the present disclosure. The tasks may be iteratively performed. The method may begin at 200. Although during the following tasks acknowledgement (ACK) signals are generated subsequent to receiving response and confirmation signals, additional ACK signals may be transmitted in response to receiving other signals, such as request signals, teardown signals, etc. Any of the ACK signals may not be generated. The method of FIG. 3 may be a unicast-initiated or a broadcast-initiated method depending upon whether a request signal is broadcast to multiple stations.

Tasks 202, 206 include transmission and receipt of different request signals. The request signals may be transmitted directly between first and second stations $STA_1$, $STA_2$, from the first station $STA_1$ to the second station $STA_2$ via an AP, and/or from a first station $STA_1$ to an AP and then broadcasted from the AP and received at multiple stations including the second station $STA_2$.

At 200, the first station $STA_1$ is unaware of a TDLS link existing between the stations $STA_1$, $STA_2$. In other words, the first station $STA_1$: does not have link information for an active TDLS link between the stations $STA_1$, $STA_2$ stored in the memory of the first station $STA_1$; and/or has a link status indicator indicating that a TDLS link does not exist between the stations $STA_1$, $STA_2$.

At 202, the first station $STA_1$ (e.g., the station 50 of FIG. 2) generates a request signal via an ARP module (e.g., the ARP module 70). The request signal may include an ARP request and may be transmitted to an AP (e.g., the $AP_1$). The AP may then transmit the request signal to the second station $STA_2$ and/or broadcast the request signal to multiple stations including the second station $STA_2$.

At 203, the second station $STA_2$ generates the response signal based on the request signal and transmits the response signal to the first station $STA_1$. The response signal may include an ARP response. The response signal is not transmitted first to the AP and then to the first station $STA_1$, but rather is transmitted directly from the second station $STA_2$ to the first station $STA_1$.

The second station $STA_2$ may transmit the response signal to the first station $STA_1$ using a TDLS link previously established between the stations $STA_1$, $STA_2$. If a previously established TDLS link is used, the second station $STA_2$ may: have link information for a TDLS link between the stations $STA_1$, $STA_2$ stored in a memory of the second station $STA_2$; and/or have a link status indicator indicating that a TDLS link does exist between the stations $STA_1$, $STA_2$. If a TDLS link was previously established between the stations $STA_1$, $STA_2$, the link is broken, since there are inconsistencies between TDLS link statuses stored in the $STA_1$, $STA_2$ and/or determined at the stations $STA_1$, $STA_2$. These inconsistencies are eliminated in tasks 214-216. At 204, the ARP module of the first station $STA_1$ receives a response signal transmitted directly from the second station $STA_2$ to the first station $STA_1$.

At 206, the ARP module and/or the TDLS module of the first station $STA_1$ receives an ARP request signal and/or a packet transmitted directly from the second station $STA_2$ to the first station $STA_1$. The ARP request and/or packet may include bits ToDS, FromDS, which may be set to 00.

At 208, an ACK module (e.g., 58) of the first station $STA_1$ transmits an ACK signal to the second station $STA_2$ in response to receiving the response signal at 204, the ARP request signal at 206 and/or the packet at 206. The ACK signal is transmitted directly to the second station $STA_2$.

At 210, the control module of the first station $STA_1$ and/or an upper layer device of the first station $STA_1$ drops the response signal, the ARP request signal and/or the packet received at 204 or 206. The upper layer device refers to a device that is associated with a layer higher than a PHY layer and a MAC layer. In one implementation, the control module or the upper layer device searches the memory of the first station $STA_1$ for link information associated with a TDLS link between the stations $STA_1$, $STA_2$. The control module or upper layer device determines that a TDLS link does not exist between the stations $STA_1$, $STA_2$ and for at least this reason drops the response signal, the ARP request signal and/or the packet received at 204, 206.

In an alternative implementation, a PHY layer device or a MAC layer device of the first station $STA_1$ searches the memory of the first station $STA_1$ for link information associated with a TDLS link between the stations $STA_1$, $STA_2$. The PHY layer device or MAC layer device then determines that a TDLS link does not exist between the stations $STA_1$, $STA_2$ and drops the response signal, the ARP request signal and/or the packet received at 204, 206.

At 212, the TDLS module of the first station $STA_1$ determines whether to perform task 214 or task 218. Task 214 is performed when a TDLS link was previously established between the stations $STA_1$, $STA_2$. Task 218 is performed when a TDLS link was not previously established between the stations $STA_1$, $STA_2$.

At 214, the TDLS module determines whether the first station $STA_1$ is operating in the secure mode. Task 216 is performed when the control module and/or the TDLS module are operating in the secure mode, otherwise task 218 is performed. In one implementation, task 214 is not performed. If task 214 is not performed, task 216 is performed when a preexisting TDLS link was established, as determined at 212.

At 216, the teardown module of the first station $STA_1$ generates a teardown request signal, which is transmitted to the second station $STA_2$ by a PHY module of the first station $STA_1$. The teardown request signal is transmitted from the first station $STA_1$ to the AP and then from the AP to the second station $STA_2$. The teardown request signal may not include a fast transition information element (FTIE). This is because the first station $STA_1$ may not have retained information including a peer nonce value of the second station $STA_2$ for the previously established TDLS link. For this reason, inclusion of the FTIE in the teardown request signal sent via the AP to the second station $STA_2$ is optional. The teardown request signal is transmitted to the second station $STA_2$ to cause the second station $STA_2$ to clear parameters and resources associated with the previously established TDLS link. This includes changing link information at the second station $STA_2$ to indicate that a TDLS link does not exist between the stations $STA_1$, $STA_2$.

At 218, the teardown module the first station $STA_1$ generates a teardown request signal, which is transmitted from the first station $STA_1$ to the second station $STA_2$ via the AP. The teardown request signal does not include an FTIE and requests that the second station $STA_2$ change TDLS link information associated with the first station $STA_1$ to indicate that a TDLS link does not exist between the stations $STA_1$, $STA_2$.

At 220, a teardown module of the second station $STA_2$ tears down the previously established TDLS link between the stations $STA_1$, $STA_2$. This eliminates the link information inconsistencies of the stations $STA_1$, $STA_2$, since both of the stations $STA_1$, $STA_2$ have link status information indicating that a direct link does not exist between the stations $STA_1$, $STA_2$ subsequent to task 220. The method may end subsequent to task 220 or may continue to task 222 to establish a TDLS link, as shown. Task 222 may be performed, for example, when the first station $STA_1$ has data to send to the second station $STA_2$.

At 222, a TDLS link is established between the stations $STA_1$, $STA_2$. This may include performing a station-to-station link (STSL) master key (SMK) and/or TDLS peer key (TPK) handshake between the stations $STA_1$, $STA_2$. At 222A, a setup module and/or control module of the first stations $STA_1$ sends a second request signal including a TDLS setup request to the second station $STA_2$ via the AP. The second request signal may include a first FTIE for the SMK and/or TPK handshake and be transmitted to the second station $STA_2$ to establish the TPKSA between the stations $STA_1$, $STA_2$. The second request signal may also include: a link identifier; an action field; communication rates and channels supported by the first station $STA_1$; quality of service values; a robust security network information element (RSNIE); and other request information.

At 222B, a setup module and/or control module of the second station $STA_2$ sends a second response signal including a second TDLS setup response to the first station $STA_1$ via the AP in response to receiving the second request signal. The second response signal may include a second FTIE. The second response signal may include: the link identifier; an action field; a status code; communication rates and channels supported by the second station $STA_2$; quality of service values; a second RSNIE; and other response information. The status code may be set to 0 when the request signal is received successfully.

At 222C, a PHY module and/or MAC module of the first station $STA_1$ sends a second ACK signal to the first station in response to receiving the second response signal. At 222D, the setup module and/or control module of the first station $STA_1$ sends a confirmation (or confirm) signal including TDLS setup confirm code to the second station $STA_2$ via the AP. The confirmation signal may be generated based on the second response signal and include: the link identifier; an action field, a third RSNIE; a third FTIE; and/or other confirmation information. With respect to the first station $STA_1$, the SMK and/or TPK handshake is complete and a TDLS link is established between the stations $STA_1$, $STA_2$ upon sending the confirmation signal.

Prior to sending the second response signal, the setup module and/or control module of the first station $STA_1$ may perform multiple checks. Although example checks are disclosed below, one or more of the example checks may not be performed and/or other checks may be performed. As a first example check, the first station $STA_1$ may verify and/or compare (i) a MAC address of the second station $STA_2$ as indicated by or determined based on the second response signal to (ii) direct link information including a MAC address stored at the first station for the second station $STA_2$. If the MAC addresses for the second station $STA_2$ do not match, the first station $STA_1$ may drop the second response signal and not send the confirmation signal.

As a second example check, the first station $STA_1$ may verify and/or compare (i) a MAC address and/or an initiator nonce value as indicated in or determined based on the second FTIE with (ii) a MAC address for the first station $STA_1$ and an initiator nonce value stored in the first station $STA_1$. If the MAC addresses for the first station $STA_1$ do not match and/or the initiator nonce values do not match, the second response signal may be discarded and the confirmation signal may not be transmitted to the second station $STA_2$.

As a third example check, the first station $STA_1$ may verify and/or compare (i) a message integrity code (MIC) in or determined based on the second response signal with (ii) a stored MIC. If MICs do not match, the second response signal may be discarded and the confirmation signal may not be transmitted to the second station $STA_2$.

At 222E, the PHY module and/or the MAC module of the second station $STA_2$ may send a third ACK signal to the AP in response to the confirmation signal. The stations $STA_1$, $STA_2$ can communicate directly with each other without transmitting signals to the access point when setup of the TDLS link is completed. The above ACK signals may be transmitted on a per-hop basis. For example, the confirmation signal may be transmitted from the first station $STA_1$ to the AP and an ACK may be transmitted from the AP to the first station $STA_1$. The same packet or confirmation signal may be forwarded from the AP to the second station $STA_2$ and the second station $STA_2$ sends an ACK back to the AP.

The second station $STA_2$ may perform one or more checks prior to determining that the SMK and/or TPK handshake is complete and the TDLS link is established. As a first example check, the second station $STA_2$ may verify and/or compare (i) a MAC address of the first station $STA_1$ as indicated by or determined based on the confirmation signal to (ii) direct link information including a MAC address stored at the second station for the first station $STA_1$. If the MAC addresses for the first station $STA_1$ do not match, the second station $STA_2$ may drop the confirmation signal.

As a second example check, the second station $STA_2$ may verify and/or compare (i) a MAC address and/or an initiator nonce value as indicated in or determined based on the second FTIE with (ii) a MAC address for the second station $STA_2$ and an initiator nonce value stored in the second station $STA_2$. If the MAC addresses for the second station $STA_2$ do not match and/or the initiator nonce values do not match, the confirmation signal may be discarded. As a third example check, the second station $STA_2$ may verify and/or compare (i) a MIC in or determined based on the second response signal with (ii) a stored MIC. If MICs do not match, the confirmation signal may be discarded. The method may end at 224.

In FIG. 4, a broadcast-initiated TDLS method with timer-based TDLS link teardown is shown. Although the following tasks are primarily described with respect to the implementations of FIGS. 1-2, the tasks may be easily modified to apply to other implementations of the present disclosure. The tasks may be iteratively performed. The method may begin at 250.

At 252, a TDLS link is established between the stations $STA_1$, $STA_2$. This may include performing a SMK and/or TPK handshake between the stations $STA_1$, $STA_2$. At 252A, the setup module and/or the control module of the first station $STA_1$ sends a request signal including a first ARP request and/or a TDLS request to the second station $STA_2$ via the AP. The request signal may include a first FTIE and is transmitted to the second station $STA_2$ to establish a tunneled peer key security association (TPKSA) between the stations $STA_1$, $STA_2$. The request signal may include: a link identifier; an action field; communication rates and channels supported by the first station $STA_1$; quality of service values; a RSNIE; and other request information.

At 252B, the setup module and/or control module of the second station $STA_2$ sends a response signal including an ARP response and/or a TDLS setup response to the first station $STA_1$ via the AP in response to receiving the second request signal. The response signal may include a second FTIE. The status code may be set to 1 when the request signal is received successfully.

At 252C, the PHY module and/or MAC module of the first station $STA_1$ sends a second ACK signal to the first station in response to receiving the response signal. At 252D, the setup module and/or control module of the first station $STA_1$ sends a confirmation (or confirm) signal including an ARP confirm code to the second station $STA_2$ via the AP. The first station $STA_1$ sets a first set of timers in response to transmitting the confirmation signal. The first set of timers is used to monitor activity between the stations $STA_1$, $STA_2$. The first set of timers may include a first transmit timer and a first receive timer. The first transmit timer monitors amounts of time between transmissions from the first station $STA_1$ to the second station $STA_2$ over a direct link. The first receive timer monitors amounts of times between signals received from the second station $STA_2$ over a direct link.

At 252E, the PHY module and/or MAC module of the second station $STA_2$ sends a third ACK signal to the first station $STA_1$ via the AP in response to the confirmation signal. In one implementation, the second station $STA_2$ does not send the third ACK signal to the first station $STA_1$. The second station $STA_2$ sets a second set of timers in response to transmitting the third ACK signal and/or in response to completing setup of the TDLS link.

The second set of timers of the second station $STA_2$ is used to monitor activity between the stations $STA_1$, $STA_2$. The second set of timers may include a second transmit timer and a second receive timer. The second transmit timer monitors amounts of time between transmissions from the second station $STA_2$ to the first station $STA_1$ over a direct link. The second receive timer monitors amounts of times between signals received from the first station $STA_1$ over a direct link.

With respect to the second station $STA_2$, the SMK and/or TPK handshake may be complete and the TDLS link may be established between the stations $STA_1$, $STA_2$ when the confirmation signal is verified. This may occur upon sending the third ACK signal. The second station $STA_2$ may perform one or more checks prior to determining that the handshake is complete and the TDLS link is established.

As a first example check, the second station $STA_2$ may verify and/or compare (i) a MAC address of the first station $STA_1$ as indicated by or determined based on the confirmation signal to (ii) direct link information including a MAC address stored at the second station for the first station $STA_1$. If the MAC addresses for the first station $STA_1$ do not match, the second station $STA_2$ may drop the confirmation signal.

As a second example check, the second station $STA_2$ may verify and/or compare (i) a MAC address and/or an initiator nonce value as indicated in or determined based on the second FTIE with (ii) a MAC address for the second station $STA_2$ and an initiator nonce value stored in the second station $STA_2$. If the MAC addresses for the second station $STA_2$ do not match and/or the initiator nonce values do not match, the confirmation signal may be discarded. As a third example check, the second station $STA_2$ may verify and/or compare (i) a MIC in or determined based on the second response signal with (ii) a stored MIC. If the MICs do not match, the confirmation signal may be discarded.

At 254, timer modules of the first and second stations $STA_1$, $STA_2$ monitor respectively the first and second sets of timers. The first timer module of the first station $STA_1$ may generate a first time out signal for a TDLS link when one of the first amounts of time exceeds a first predetermined value. The second timer module of the first station $STA_1$ may generate a second time out signal for a TDLS link when one of the second amounts of time exceeds a second predetermined value.

Although the following tasks are described primarily with respect to the first station $STA_1$, the tasks may be performed by the second station $STA_2$. At 256, a first timer module of the first station $STA_1$ determines whether the first transmit timer has exceeded a first predetermined time based on the first timeout signal. Task 258 is performed when the first transmit timer has not exceeded the first predetermined time, otherwise task 260 is performed.

At 258, a second timer module of the first station $STA_1$ determines whether the first receive timer has exceeded a second predetermined value based on the second timeout signal. Task 260 is performed when the first receive timer has exceeded the second predetermined value, otherwise task 256 is performed.

At 260, a teardown module of the first station $STA_1$ initiates teardown of the TDLS link at the first station $STA_1$. This includes clearing parameters and resources associated with TDLS link information stored at the first station $STA_1$. For example, memory allocated to storing the TDLS link information may be erased, identified as available, and/or allocated to store other information.

At 262, the teardown module of the first station $STA_1$ transmits a teardown signal from the first station $STA_1$ to the second station $STA_2$ to request teardown of the TDLS link at the second station $STA_2$. At 264, the second station $STA_2$ receives the teardown signal and in response to the teardown signal tears down the TDLS link at the second station $STA_2$. This includes clearing parameters and resources associated with the TDLS link information at the second station $STA_2$. The method may end at 266.

In FIG. 5, a TDLS method including TDLS link teardown without teardown signal transmission is shown. Although the following tasks are primarily described with respect to the implementations of FIGS. 1-2, the tasks may be easily modified to apply to other implementations of the present disclosure. The tasks may be iteratively performed. The method may begin at 300.

At 302, the first station $STA_1$ directly receives a packet from the second station $STA_2$. The first station $STA_1$ does not have link information associated with a TDLS link between the stations $STA_1$, $STA_2$ and/or has link information indicating that a TDLS link between the stations $STA_1$, $STA_2$ is inactive and/or does not exist. The packet may include bits ToDS, FromDS. The bits ToDS, FromDS may be set to 00 to indicate that the packet is being transmitted directly between the stations $STA_1$, $STA_2$. The packet may include data for the first station $STA_1$ and/or may be a request for the first station $STA_1$.

At 304, in response to receiving the packet directly from the second station $STA_2$, a setup module and/or control module of the first station $STA_1$ sends a request signal to the second station $STA_2$ via an AP. The packet may be dropped at the first station $STA_1$. The request signal may include a TDLS request. This signals to the second station $STA_2$ that (i) the first station $STA_1$ does not have TDLS link information for a TDLS link between the stations $STA_1$, $STA_2$ stored at the first station $STA_1$ and/or (ii) a link status indicator at the first station $STA_1$ indicates that there is not a TDLS link between the stations $STA_1$, $STA_2$.

At 306, a teardown module of the second station $STA_2$ tears down a TDLS link between the stations $STA_1$, $STA_2$ and clears parameters and associated resources at the second station $STA_2$. The TDLS link is torn down in response to the TDLS request. A setup module of the second station $STA_2$ generates a response signal in response to the request and transmits the response signal to the first station $STA_1$ via the AP. The response signal may include a TDLS response. At 308, the first station $STA_1$ receives the response signal from the second station $STA_2$. At 310, the setup module of the first station $STA_1$ transmits a first ACK signal to the second station $STA_2$ via the AP in response to the response signal.

At 312, the setup module of the first station $STA_1$ determines whether to establish a TDLS link between the stations $STA_1$, $STA_2$. To determine whether to establish the TDLS link, the first station $STA_1$ may perform the tasks at 222D, as described with respect to the method of FIG. 3. If the first station $STA_1$ determines that the TDLS link is to be established, task 314 is performed, otherwise task 320 is performed.

At 314, the setup module and/or control module of the first station $STA_1$ transmits a confirmation signal to the second station $STA_2$ via an AP. The confirmation signal may include a TDLS setup confirm code, and/or a status code. The status code may have a value of zero. This indicates that a direct link exists between the stations $STA_1$, $STA_2$ according to the first station $STA_1$. The status code may be provided as bits ToDS and FromDS.

At 316, a second ACK signal, generated by the PHY module and/or MAC module of the second station $STA_2$, is received at the first station $STA_1$. The second ACK signal is generated in response to receiving the TDLS setup confirmation signal and is transmitted to the first station $STA_1$ via the AP. At 318, the second station continues to set up the TDLS link between the stations $STA_1$, $STA_2$ in response to receiving the TDLS confirmation signal and/or the status code. This may include allocating resources to the TDLS link.

At 320, the setup module and/or control module of the first station $STA_1$ transmits a TDLS setup confirmation signal to the second station $STA_2$ via an AP. The TDLS setup confirmation signal may include a status code having a non-zero value. This indicates that a direct link does not exist according to the first station $STA_1$ and is not to be set up between the stations $STA_1$, $STA_2$. The status code may be provided as bits ToDS and FromDS.

At 322, a third ACK signal, generated by the PHY module and/or MAC module of the second station $STA_2$, is received at the first station $STA_1$. The third ACK signal is generated in response to receiving the TDLS setup confirmation signal and is transmitted to the first station $STA_1$ via the AP. At 324, the second station $STA_2$ refrains from setting up the TDLS link in response to receiving the TDLS setup confirmation signal and/or the non-zero status code. The method may end at 326.

According to both of the stations $STA_1$, $STA_2$ and by performing tasks 312-324, (i) a TDLS link is established and exists between the stations $STA_1$, $STA_2$ or (ii) the TDLS link is not established and a TDLS link does not exist between the stations $STA_1$, $STA_2$. As a result, an inconsistent link information condition does not exist. Both stations of the $STA_1$, $STA_2$ either have link information indicating that a direct link exists between the stations $STA_1$, $STA_2$ or have link information indicating that a direct link does not exist between the stations $STA_1$, $STA_2$.

The above-described tasks of FIGS. 3-5 are meant to be illustrative examples; the tasks may be performed sequentially, synchronously, simultaneously, continuously, during overlapping time periods or in a different order depending upon the application. Also, any of the tasks may not be performed or skipped depending on the implementation and/or sequence of events.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Although the terms first, second, third, etc. may be used herein to describe various stations, devices, signals, elements, and/or components, these items should not be limited by these terms. These terms may be only used to distinguish one item from another item. Terms such as "first," "second," and other numerical terms when used herein do not imply a sequence or order unless clearly indicated by the context. Thus, a first item discussed below could be termed a second item without departing from the teachings of the example implementations.

What is claimed is:

1. A method comprising:
directly receiving, at a first station, a signal transmitted from a second station, wherein each of the first station and the second station respectively includes a link status indicator that indicates whether a direct link exists between the first station and the second station, and wherein the signal directly received at the first station was transmitted by the second station based on the link status indicator of the second station indicating that a direct link does exist between the first station and the second station; and
responsive to the link status indicator of the first station indicating that a direct link does not exist between the first station and the second station and while the link status indicator of the second station indicates that the direct link does exist and conflicts with the link status indicator of the first station,
dropping the signal received at the first station, and
subsequent to dropping the signal received at the first station, transmitting a teardown signal from the first station to the second station, wherein responsive to the teardown signal being transmitted from the first station to the second station, the link status indicator of the second station is to be changed, by the second station, to indicate that a direct link does not exist between the first station and the second station.

2. The method of claim 1, further comprising:
transmitting, from the first station to the second station, an address resolution protocol request or a tunneled direct link setup request,
wherein directly receiving, at the first station, the signal from the second station comprises directly receiving, at the first station, the signal from the second station responsive to the address resolution protocol request or the tunneled direct link setup request transmitted from the first station.

3. The method of claim 1, wherein the signal received at the first station is an address resolution protocol request signal comprising distribution system bits, wherein the distribution system bits indicate the signal received at the first station has been transmitted directly from the second station to the first station.

4. The method of claim 1, further comprising transmitting an acknowledgement signal from the first station to the second station (i) in response to the signal received at the first station, (ii) prior to dropping the signal received at the first station, and (iii) prior to sending the teardown signal from the first station to the second station.

5. The method of claim 4, further comprising:
operating the first station in a secure mode if the direct link did previously exist between the first station and the second station; and
refraining from operating in the secure mode if the direct link did not previously exist between the first station and the second station,
wherein the teardown signal is sent from the first station to the second station while the first station is operating in the secure mode.

6. The method of claim 1, further comprising determining, at the first station, whether a direct link previously existed between the first station and the second station, wherein:
the teardown signal includes a transition information element when according to the first station a direct link previously existed between the first station and the second station;

the teardown signal does not include the transition information element when according to the first station a direct link did not previously exist between the first station and the second station; and
the transition information element comprises a message integrity code value, a first nonce value of the first station, and a second nonce value of the second station.

7. The method of claim 6, further comprising:
subsequent to the second station changing the link status indicator of the second station, transmitting a second signal from the first station to the second station to reestablish a link between the first station and the second station; and
transmitting data from the first station to the second station subsequent to the link being reestablished between the first station and the second station.

8. The method of claim 7, further comprising:
based on the second signal, receiving an address resolution protocol response or a tunneled direct link setup request from the second station at the first station;
sending a first acknowledgement signal from the first station to the second station in response to the address resolution protocol response or the tunneled direct link setup request;
subsequent to sending the first acknowledgement signal, sending a confirmation signal from the first station to the second station; and
receiving a second acknowledgement signal from the second station at the first station based on the confirmation signal.

9. The method of claim 1, further comprising determining whether a direct link previously existed between the first station and the second station, wherein:
the teardown signal does not include a transition information element when according to the first station a direct link previously existed between the first station and the second station; and
the transition information element comprises a message integrity code value, a first nonce value of the first station, and a second nonce value of the second station.

10. The method of claim 1, wherein the teardown signal is transmitted from the first station to the second station in response to the signal received at the first station.

11. The method of claim 1, wherein the signal received at the first station is a tunneled direct link setup signal.

12. The method of claim 1, wherein the signal received at the first station comprises a packet of data.

13. A method comprising:
directly receiving, at a first station, a signal transmitted from a second station, wherein each of the first station and the second station respectively includes a link status indicator that indicates whether a direct link exists between the first station and the second station, and wherein the signal directly received at the first station was transmitted by the second station based on the link status indicator of the second station indicating that a direct link does exist between the first station and the second station;
responsive to the link status indicator of the first station indicating that a direct link does not exist between the first station and the second station,
dropping the signal received at the first station, and
subsequent to dropping the signal received at the first station, transmitting a teardown signal from the first station to the second station, wherein responsive to the teardown signal being transmitted from the first station to the second station, the link status indicator of the second station is to be changed, by the second station, to indicate that a direct link does not exist between the first station and the second station; and determining whether the first station is operating in a secure mode, wherein the teardown signal includes a transition information element when the first station is operating in the secure mode, the teardown signal does not include the transition information element when the first station is not operating in the secure mode, and the transition information element comprises a message integrity code value, a first nonce value of the first station, and a second nonce value of the second station.

14. A system comprising:

a physical layer module configured to directly receive at a first station a signal transmitted from a second station, wherein each of the first station and the second station respectively includes a link status indicator that indicates whether a direct link exists between the first station and the second station, and wherein the signal directly received at the first station was transmitted by the second station based on the link status indicator of the second station indicating that a direct link does exist between the first station and the second station; and a control module configured to and in response to the link status indicator of the first station indicating that a direct link does not exist between the first station and the second station and while the link status indicator of the second station indicates that the direct link does exist and conflicts with the link status indicator of the first station, drop the signal received at the first station, and subsequent to dropping the signal received at the first station, transmit a teardown signal from the first station to the second station, wherein responsive to the teardown signal being transmitted from the first station to the second station, the link status indicator of the second station is to be changed, by the second station, to indicate that a direct link does not exist between the first station and the second station.

15. The system of claim 14, wherein:

the physical layer module is configured to transmit, from the first station to the second station, an address resolution protocol request or a tunneled direct link setup request; and the physical layer module is configured to directly receive, at the first station, the signal from the second station in response to the address resolution protocol request or the tunneled direct link setup request transmitted from the first station.

16. The system of claim 14, wherein the signal received at the first station is an address resolution protocol request signal comprising distribution system bits, and wherein the distribution system bits indicate the signal received at the first station has been transmitted directly from the second station to the first station.

17. The system of claim 14, wherein the physical layer module is configured to transmit an acknowledgement signal from the first station to the second station (i) in response to the signal received at the first station, (ii) prior to dropping the signal received at the first station, and (iii) prior to sending the teardown signal from the first station to the second station.

18. The system of claim 14, wherein the control module is configured to determine, at the first station, whether a direct link previously existed between the first station and the second station, and wherein:

the teardown signal includes a transition information element when according to the first station a direct link previously existed between the first station and the second station;

the teardown signal does not include the transition information element when according to the first station a direct link did not previously exist between the first station and the second station; and the transition information element comprises a message integrity code value, a first nonce value of the first station, and a second nonce value of the second station.

19. The system of claim 14, wherein the control module is configured to determine whether a direct link previously existed between the first station and the second station, and wherein:

the teardown signal does not include a transition information element when according to the first station a direct link previously existed between the first station and the second station; and the transition information element comprises a message integrity code value, a first nonce value of the first station, and a second nonce value of the second station.

20. The system of claim 14, wherein the control module is configured to determine whether the first station is operating in a secure mode, and wherein:

the teardown signal includes a transition information element when the first station is operating in the secure mode;

the teardown signal does not include the transition information element when the first station is not operating in the secure mode; and the transition information element comprises a message integrity code value, a first nonce value of the first station, and a second nonce value of the second station.

21. A non-transitory computer readable medium that stores a computer program with instructions to:

directly receive, at a first station, a signal transmitted from a second station, wherein each of the first station and the second station respectively includes a link status indicator that indicates whether a direct link exists between the first station and the second station, and wherein the signal directly received at the first station was transmitted by the second station based on the link status indicator of the second station indicating that a direct link does exist between the first station and the second station; and responsive to the link status indicator of the first station indicating that a direct link does not exist between the first station and the second station and while the link status indicator of the second station indicates that the direct link does exist and conflicts with the link status indicator of the first station, drop the signal received at the first station, and subsequent to dropping the signal received at the first station, transmit a teardown signal from the first station to the second station, wherein responsive to the teardown signal being transmitted from the first station to the second station, the link status indicator of the second station is to be changed, by the second station, to indicate that a direct link does not exist between the first station and the second station.

22. The non-transitory computer readable medium of claim 21, wherein the computer program further comprises instructions to transmit, from the first station to the second station, an address resolution protocol request or a tunneled direct link setup request,
    wherein directly receiving, at the first station, the signal from the second station comprises directly receiving, at the first station, the signal from the second station responsive to the address resolution protocol request or the tunneled direct link setup request transmitted from the first station.

23. The non-transitory computer readable medium of claim 21, wherein the signal received at the first station is an address resolution protocol request signal comprising distribution system bits, wherein the distribution system bits indicate the signal received at the first station has been transmitted directly from the second station to the first station.

24. The non-transitory computer readable medium of claim 21, wherein the computer program further comprises instructions to transmit an acknowledgement signal from the first station to the second station (i) in response to the signal received at the first station, (ii) prior to dropping the signal received at the first station, and (iii) prior to sending the teardown signal from the first station to the second station.

* * * * *